United States Patent [19]

Dugua

[11] Patent Number: 4,900,521

[45] Date of Patent: Feb. 13, 1990

[54] PROCESS FOR PURIFYING ALUMINUM CHLORIDE

[75] Inventor: Jacques Dugua, Charly par Vernaison, France

[73] Assignee: Atochem, Paris, France

[21] Appl. No.: 145,455

[22] Filed: Jan. 19, 1988

[30] Foreign Application Priority Data

Jan. 21, 1987 [FR] France .................................. 87 00668

[51] Int. Cl.$^4$ ............................................... C01F 7/62
[52] U.S. Cl. ................................... 423/130; 423/135; 423/240; 423/495
[58] Field of Search ............ 423/130, 135, 495, 240 R; 55/71

[56] References Cited

U.S. PATENT DOCUMENTS

| | | | |
|---|---|---|---|
| 1,269,236 | 6/1918 | Weaver | 423/135 |
| 1,426,081 | 8/1922 | Hoover | 423/130 |
| 1,903,486 | 3/1933 | Wurster et al. | 423/135 |
| 2,945,911 | 7/1960 | Murray | 423/130 |
| 3,336,731 | 8/1967 | Phillips et al. | 55/71 |
| 3,627,483 | 2/1970 | Cole et al. | 423/135 |
| 3,832,452 | 8/1974 | Crouch, Jr. | 423/495 |
| 4,017,584 | 4/1977 | Messina et al. | 423/495 |
| 4,035,169 | 7/1977 | Sebenik et al. | 423/240 |
| 4,469,661 | -9/1984 | Schultz | 423/495 |
| 4,541,907 | 9/1985 | Culleiton et al. | 423/135 |

FOREIGN PATENT DOCUMENTS

| | | |
|---|---|---|
| 2014772 | 10/1970 | Fed. Rep. of Germany . |
| 46-12285 | 3/1971 | Japan ................................... 423/495 |
| 47-46673 | 11/1972 | Japan ................................... 423/495 |
| 342208 | 1/1931 | United Kingdom . |

OTHER PUBLICATIONS

"Soviet Inventions Illustrated", 214526, Nov., 1968 (Derwent Publications Ltd., RochDale House, Theobalds Rd., London, W.C.I.).

Ota et al., "Decomposition of Polychlorobiphenyl into Carbon and Hydrogen Chloride by Using Molten Salt", Nippon Kagakukaishi 1977 (9), pp. 1407 to 1409.

"Industrial Inorganics", vol. 96, 1982, p. 153, 96:54731q.

"Chemical Abstract", vol. 69, 1968, No. 12, 44947t.

*Primary Examiner*—John Doll
*Assistant Examiner*—Wayne A. Langel
*Attorney, Agent, or Firm*—Sigalos, Levine & Montgomery

[57] ABSTRACT

A process for purifying anhydrous aluminum chloride containing organochlorine impurities, comprising contacting said impure aluminum chloride with a bath containing at least one chloroaluminate for a time sufficient to remove said impurities therefrom and recovering the purified aluminum chloride in the vapor phase of the chloroaluminate bath.

5 Claims, No Drawings

PROCESS FOR PURIFYING ALUMINUM CHLORIDE

BACKGROUND OF THE INVENTION

The present invention pertains to the purification of anhydrous aluminum chloride.

Aluminum chloride is used as a catalyst in organic chemistry and it can be used to prepare aluminum. Two groups of industrial processes are available for its manufacture; the reaction of gaseous chlorine with molten aluminum and the carbochlorination of aluminum. The reaction of aluminum, chlorine and a carbon-containing material, which can be coke or carbon monoxide, is used in the second group. However, depending on the nature and the origin of the carbon, organochlorine compounds, which can be aromatic, or their condensation products are found in the aluminum chloride obtained, in addition to certain metal chlorides. It is often necessary to use pure aluminum chloride in catalysis or in cosmetic preparations and the presence or organochlorine compounds is highly troublesome and also deleterious.

Regardless of the origin of the aluminum chloride, the problem of purification arises if it contains organochlorine compounds.

The removal of organic impurities present in aluminum chloride has been described in several publications.

The purification of aluminum chloride containing hexachlorobenzene by passing the mixture of $AlCl_3$ and $C_6Cl_6$ over aluminum at 600° C. is described in Japanese Patent Application No. 31,452/66 of Mar. 29, 1966. The $C_6Cl_6$ is completely destroyed, and carbon is precipitated on the surface of the aluminum. The aluminum is generated by heating at 600° C. in the presence of air to oxidize the carbon. A similar process, in which iron having a temperature of 805° C. is used, or $AlCl_3$ containing $C_6Cl_6$ is passed into a zinc bath at 700° C., is disclosed in Japanese Patent Application No. 31,451/66 of Mar. 29, 1966.

It is explained in U.S. Pat. No. 4,541,907 that by passing $AlCl_3$ containing organochlorine impurities, which are essentially represented by $C_6Cl_6$, over aluminum and carbon in a fluidized bed, an aluminum chloride free of chlorinated products is obtained. These processes have the disadvantage of involving the use of elevated temperatures.

It is also possible to use conventional separation processes based on the differences between the sublimation temperatures and/or the boiling points or between the adsorptions on various supports. However, these processes have the disadvantage that the aluminum chloride is incompletely purified and that they do not lead to destruction of the impurities. Products rich in organochlorine compounds are obtained which cannot be treated.

SUMMARY OF THE INVENTION

A new process for purifying anhydrous aluminum chloride containing organochlorine compounds has now been found.

Briefly, the purification process comprises bringing the anhydrous aluminum chloride into contact with a bath comprising at least one chloroaluminate and recovering the purified aluminum chloride in the vapor phase of the chloroaluminate bath.

DETAILED DESCRIPTION

The anhydrous aluminum chloride containing the organochlorine compounds is called "contaminated aluminum chloride".

Various chloroaluminates or their mixtures; e.g., chloroaluminates of potassium, lithium, sodium, calcium, strontium or ammonium can be used. "Chloroaluminate" as used herein means any mixture of aluminum chloride with one or several metal chlorides.

"Sodium chloroaluminate", which is preferably used, means a mixture of aluminum chloride and sodium chloride in any ratio rather than only the equimolar mixture.

The sodium chloroaluminate may also contain lithium chloride and/or potassium chloride. It is also possible to use any mixture of aluminum chloride, sodium chloride and lithium chloride, which is called "sodium-lithium chloroaluminate".

The sodium chloroaluminate also preferably contains at least 50 mol. % aluminum chloride and has a melting point below 200° C.

It is possible to use a chloroaluminate with a higher NaCl content in such a proportion that after mixing with the contaminated aluminum chloride, a sodium chloroaluminate containing less than 50 mol. % NaCl and also the organochlorine compounds will be obtained.

The present invention covers all organochlorine compounds, but it is especially useful with respect to aliphatic chlorinated or perchlorinated compounds containing more than two carbon atoms, cyclic, heterocyclic, aromatic, monocyclic or polycyclic compounds and especially polychlorobiphenyls.

The contaminated aluminum chloride may be in the gaseous, solid, or liquid phase. If it is liquid or solid, it is sufficient to pour it into the chloroaluminate bath, maintaining it in the liquid state. If the contaminated aluminum chloride is in the gaseous phase, it can be brought into contact with the chloroaluminate bath by any means suitable for contacting a liquid phase with a gaseous phase. This may be a tray tower or a packed tower and it is also possible to introduce the contaminated aluminum chloride into an agitated chloroaluminate bath via a tube reaching the bottom of the said tank.

The aluminum chloride is distributed between the liquid phase and the gaseous phase of the chloroaluminate. If the contaminated aluminum chloride contains inert or incondensable substances, such as nitrogen, air, carbon monoxide or the like, they will remain in the gaseous phase. The organochlorine compounds are also distributed between the gaseous phase and the liquid phase of the chloroaluminate. The contaminated aluminum chloride is maintained in contact with the chloroaluminate bath for the time necessary for the destruction of the organochlorine compounds. The contacting is achieved; e.g., in a tray tower or a packed tower by continually mixing the liquid and gaseous phases so that the chlorinated compounds to be destroyed are in good contact with the chloroaluminate bath. It is also possible to use a cascade of stirred reactors. The residence time is adjusted by varying the flow rates and/or the volumes of the tower or of the reactors of the cascade.

A batch-type or continuous operation can be used.

Even though it is possible to operate at any temperature provided that the chloroaluminate is liquid, temperatures below about 300° C., especially temperatures between 200° C. and 300° C., are preferably used.

The rate of destruction of the chlorinated products, especially of the aromatics, increases with rising chloroaluminate bath temperature. The residence time can vary within broad limits, but it is generally between a few minutes and a few hours.

The aluminum chloride is recovered in the gaseous phase above the chloroaluminate bath. The simplest recovery method is to entrain the aluminum chloride by a dry gas stream and to subsequently precipitate the pure aluminum chloride on a cold surface at a temperature lower than the sublimation temperature.

The dry gas may be air or nitrogen. In addition to the aluminum chloride and the dry entraining gas, lightweight decomposition products of the chlorinated compounds which were originally present in the contaminated aluminum chloride; e.g., carbon tetrachloride and/or hexachloroethane, can also be found in the gaseous phase. This mixture of dry carrier gas, aluminum chloride and lightweight compounds, can be treated in a known manner to recover the pure aluminum chloride; e.g., by deposition on a cold surface. It is important to note that the chlorinated compounds, such as the aromatics, especially the polychlorobiphenyls, which were present in the contaminated aluminum chloride, have disappeared and cannot be found in the aluminum chloride which is recovered above the chloroaluminate bath.

If the chloroaluminate bath is analyzed after the necessary residence time of the contaminated aluminum chloride, no traces of organochlorine compounds such as aromatics and polychlorobiphenyls are found.

It is also possible to periodically purge the chloroaluminate bath to prevent very heavy products and dust which can accompany the contaminated aluminum chloride from accumulating.

Traces of organochlorine products such as aromatics or polychlorobiphenyls are also not found during this purging.

In the preferred embodiment of the present invention, one or several powdered metals selected from among the reducing metals; e.g., aluminum or zinc, are added to the chloroaluminate bath.

A metal powder with a mean grain size below 500μ is preferably used.

If metals are used, the organochlorine compounds are completely removed as before, but at a distinctly higher rate, this rate being higher than the rate in the previous case by a factor ranging from a few multiples of one to several multiples of ten.

If metals other than aluminum are used, chlorides of these metals may form, which will pass over into the gaseous phase with the aluminum chloride above the chloroaluminate bath. This presence of chlorides of other metals in the aluminum chloride may be desirable for certain applications. However, preparation of a pure aluminum chloride is most often desirable. Regardless of the metal chlorides which are thus added to the aluminum chloride, the principal result obtained will always be the destruction of the chlorinated compounds or the type of aromatic compounds or polychlorobiphenyls which are present in the contaminated aluminum chloride.

Powdered aluminum is preferably used.

Another advantage of using aluminum is that the ferric chloride that may possibly be present in the contaminated aluminum chloride is destroyed. This ferric chloride is transformed into ferrous chloride which precipitates in the chloroaluminate bath.

Consumption of aluminum powder is observed, which can indicate that aluminum chloride was formed by the removal of chlorine from the chlorinated compounds introduced with the contaminated aluminum chloride. The amount of the aluminum powder is not limited; it is enough to use it in the sufficient amount, but it should not be used in excessively large amounts to avoid considerable losses during the purging of the bath. The preferred amounts of aluminum powder in the chloroaluminate bath are up to 5 wt. % or 10 wt. %. It is seen that the rate of destruction of the chlorinated compounds increases with increasing amount of aluminum powder and with rising chloroaluminate bath temperature.

The bath is preferably agitated so that the metal powder is well dispersed in the bath.

The present invention will be further described in connection with the following examples which are set forth for purposes of illustration only.

EXAMPLE 1

900 g of sodium chloroaluminate containing 65 mol. % $AlCl_3$ were charged into a 1.5-liter stainless-steel vessel heated with a bath and equipped with a six-blade helical agitator rotating at a speed of 400 rpm and with baffles. 200 g of contaminated aluminum chloride containing the following substances (stated in ppm) were then added:

| tetrachlorobenzene | 60 | perchlorobenzonitrile | 30 |
| pentachlorobenzene | 220 | perchlorostyrene | 10 |
| hexachlorobenzene | 570 | decachlorobiphenyl | 65. |

45 g of fine aluminum powder (type Pechiney XY 49) were added, and the mixture was heated to 200° C.; the time at which this temperature was reached was designated by t=0, after which this agitated bath was maintained at this temperature. Samples were taken at different times from the liquid-phase chloroaluminate bath, which was immediately cooled and a small amount of $AlCl_3$ was sublimed at the same time in the chloroaluminate bath with a nitrogen stream, and this $AlCl_3$ was recovered in a cooled Pyrex vessel. At the end of the experiment, the 200 g of $AlCl_3$ added at the beginning of the experiment were sublimed in the same manner.

The results are shown in Table I below. The chlorobenzenes are designated by their formulas; PCBN is perchlorobenzonitrile, PS is perchlorostyrene, and DCBP is decachlorobiphenyl.

EXAMPLE 2

The same procedure was followed as in Example 1, but at 225° C. The time t=0 was measured when the temperature of the chloroaluminate bath reached 225° C.

The results are shown in Table II below.

EXAMPLE 3

The same procedure was followed as in Example 1, but at 250° C. The time t=0 was measured when the temperature of the chloroaluminate bath reached 250° C.

The results are shown in Table III below.

EXAMPLE 4

The process described in Example 1 was carried out four different times, each time with different amounts of aluminum powder. The mixture was heated to 200° C., and the time t=0 was noted when this temperature was reached. The concentrations of the chlorinated compounds in the chloroaluminate and in the gaseous phase were measured at the time t=one hour.

The results are shown in Table IV below.

TABLE I

| | Concentration in ppm | | | | | | |
|---|---|---|---|---|---|---|---|
| | In the chloroaluminate | | | | | In AlCl$_3$ gaseous phase of chloraluminate | |
| Time, t | 0 | 15' | 30' | 1h | 2h | 1h | 2h |
| C$_6$H$_2$Cl$_4$ | 9 | 11 | 16 | 20 | 11 | 15 | 20 |
| C$_6$HCl$_5$ | 48 | 50 | 62 | 40 | 13 | 60 | 25 |
| C$_6$Cl$_6$ | 50 | 37 | 33 | 15 | 2.5 | 20 | 4 |
| PCBN | | | | 0.8 | 0.5 | 0.7 | 0.5 |
| PS | | | | | 0.01 | 0.02 | 0.04 |
| DCBP | 2.5 | 2 | 0.7 | 0.5 | 0.8 | 0.3 | 0.03 |

Temperature of the chloroaluminate bath: 200° C.
% of aluminum powder in the initial bath before introduction of the contaminated AlCl$_3$: 5%.

TABLE II

| | Concentration in ppm | | | | | | |
|---|---|---|---|---|---|---|---|
| | In the chloroaluminate | | | | | In AlCl$_3$ gaseous phase of chloroaluminate | |
| Time, t | 0 | 15' | 30' | 1h | 2h | 30' | 1h | 2h |
| C$_6$H$_2$Cl$_4$ | 10 | 14 | 12 | 2 | 2 | 13 | 6 | 2 |
| C$_6$HCl$_5$ | 47 | 43 | 20 | 6.2 | 0.8 | 38 | 6 | 0.6 |
| C$_6$Cl$_6$ | 47 | 20 | 5 | 1.1 | 0.2 | 8 | 1 | 0.4 |
| PCBN | | 1 | 0.3 | 0.2 | 0.1 | 0.5 | 0.1 | 0.02 |
| PS | | | | 0.04 | | 0.02 | 0.04 | |
| DCBP | 2.7 | 0.6 | 0.15 | 0.04 | 0.01 | 0.01 | 0.02 | 0.04 |

Temperature of the chloroaluminate bath: 225° C.
% of aluminum powder in the initial bath before introduction of the contaminated AlCl$_3$: 5%.

TABLE III

| | Concentration in ppm | | | | | | | |
|---|---|---|---|---|---|---|---|---|
| | In the chloroaluminate | | | | | In AlCl$_3$ gaseous phase of chloroaluminate | | |
| Time, t | 0 | 12' | 30' | 1h | 2h | 12' | 1h | 2h |
| C$_6$H$_2$Cl$_4$ | 3.5 | 8 | 0.13 | | | 20 | 0.03 | |
| C$_6$HCl$_5$ | 18 | 15 | 0.16 | 0.06 | 0.03 | 51 | 0.1 | 0.8 |
| C$_6$Cl$_6$ | 19 | 3.5 | 0.25 | 0.01 | 0.05 | 10 | 0.1 | 0.1 |
| PCBN | 0.6 | 0.4 | 0.02 | | | 1.4 | | |
| PS | | | | | | | | |
| DCBP | 1.7 | 0.1 | 0.05 | 0.02 | 0.02 | 0.5 | | 0.05 |

Temperature of the chloroaluminate bath: 250° C.
% of aluminum powder in the initial bath before introduction of the contaminated AlCl$_3$: 5%.

TABLE IV

| | Concentration in ppm measured at t = 1 hr. | | | | |
|---|---|---|---|---|---|
| | In the chloroaluminate | | | | In AlCl$_3$ gaseous phase of chloroaluminate |
| % aluminum* | 0 | 5 | 10 | 15 | 0 |
| C$_6$H$_2$Cl$_4$ | 0.6 | 20 | 6 | 2 | |
| C$_6$HCl$_5$ | 25 | 40 | 3 | 2 | 96 |
| C$_6$Cl$_6$ | 70 | 15 | 1 | 0.6 | 150 |
| PCBN | | 0.8 | 0.4 | 0.3 | |
| PS | | | | 0.01 | |
| DCBP | 5 | 0.5 | 0.04 | 0.03 | 1 |

Temperature of the chloroaluminate bath: 200° C.
*powder express in percentage of the initial bath before introduction of the contaminated AlCl$_3$.

While the invention has been described in connection with a preferred embodiment, it is not intended to limit the scope of the invention to the particular form set forth, but, on the contrary, it is intended to cover such alternatives, modifications, and equivalents as may be included within the spirit and scope of the invention as defined by the appended claims.

What is claimed is:

1. A process for purifying anhydrous aluminum chloride containing organochlorine impurities, comprising contacting said impure aluminum chloride with a bath containing at least one chloroaluminate for a time sufficient to completely destroy said organochlorine impurities and recovering the purified aluminum chloride in the vapor phase of the chloroaluminate bath.

2. The process of claim 1, wherein the chloroaluminate is a sodium chloroaluminate.

3. The process of claim 2, wherein said bath also contains at least one reducing metal in powdered form.

4. The process of claim 3, wherein the metal is aluminum.

5. The process of any one of claims 1 through 4, wherein the temperature of the chloroaluminate bath is about 300° C. or lower.

* * * * *